(12) United States Patent
Barowski et al.

(10) Patent No.: US 10,366,191 B2
(45) Date of Patent: *Jul. 30, 2019

(54) LAYOUT OF LARGE BLOCK SYNTHESIS BLOCKS IN INTEGRATED CIRCUITS

(71) Applicant: International Business Machines Corporation, Armonk, NY (US)

(72) Inventors: Harry Barowski, Schoenaich (DE); Harald D. Folberth, Boeblingen (DE); Joachim Keinert, Altdorf (DE); Sourav Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,929

(22) Filed: Oct. 30, 2018

(65) Prior Publication Data

US 2019/0065636 A1  Feb. 28, 2019

Related U.S. Application Data

(63) Continuation of application No. 15/840,631, filed on Dec. 13, 2017, now Pat. No. 10,235,487, which is a continuation of application No. 15/195,363, filed on Jun. 28, 2016, now Pat. No. 9,910,948, which is a continuation of application No. 15/007,754, filed on Jan. 27, 2016, now Pat. No. 9,928,329.

(51) Int. Cl.
*G06F 17/50* (2006.01)

(52) U.S. Cl.
CPC ........ *G06F 17/505* (2013.01); *G06F 17/5072* (2013.01); *G06F 17/5077* (2013.01); *G06F 2217/66* (2013.01)

(58) Field of Classification Search
CPC .............. G06F 17/505; G06F 17/5077; G06F 17/5072; G06F 2217/66
See application file for complete search history.

(56) References Cited

U.S. PATENT DOCUMENTS

| | | |
|---|---|---|
| 5,493,510 A | 5/1996 | Shikata |
| 6,487,706 B1 | 11/2002 | Barkely et al. |
| 7,096,436 B2 | 8/2006 | Bednar et al. |
| 7,143,367 B2 | 11/2006 | Eng |
| 7,308,687 B2 | 12/2007 | Katagiri |
| 7,904,840 B2 | 3/2011 | Tang |

(Continued)

OTHER PUBLICATIONS

Adya, Saurabh et al. "On Whitespace and Stability in Mixed-Size Placement and Physical Synthesis," International Conference on Computer Added Design, Nov. 2003, pp. 311-318.

(Continued)

*Primary Examiner* — Naum Levin
(74) *Attorney, Agent, or Firm* — Heslin Rothenberg Farley & Mesiti P.C.; William A. Kinnaman, Jr.

(57) ABSTRACT

Generating a layout of an integrated circuit chip area from a description of an integrated circuit (IC). The description includes a register-transfer-level (RTL) design. The RTL design is partitioned in large blocks for synthesis of large block synthesis (LBS) blocks. The description of the IC further includes a floorplan for the IC, wherein each LBS block to be synthesized is assigned to a respective rectilinear shape in the floorplan and the rectilinear shapes do not overlap each other.

11 Claims, 7 Drawing Sheets

(56) References Cited

U.S. PATENT DOCUMENTS

| | | |
|---|---|---|
| 8,560,984 B1 | 10/2013 | Song et al. |
| 8,701,070 B2 | 4/2014 | Chuang et al. |
| 8,782,591 B1 | 7/2014 | Ku et al. |
| 8,793,636 B2 | 7/2014 | Alpert et al. |
| 9,910,948 B2 * | 3/2018 | Barowski .............. G06F 17/505 |
| 9,928,329 B2 * | 3/2018 | Barowski .............. G06F 17/505 |
| 2011/0023000 A1 | 1/2011 | Dirks et al. |
| 2012/0054699 A1 | 3/2012 | Cho et al. |
| 2012/0233575 A1 | 9/2012 | Kashyap |
| 2014/0359546 A1 | 12/2014 | Chan et al. |
| 2016/0085898 A1 | 3/2016 | Manohar et al. |
| 2017/0212969 A1 | 7/2017 | Barowski et al. |
| 2017/0212970 A1 | 7/2017 | Barowski et al. |
| 2018/0101625 A1 | 4/2018 | Barowski et al. |
| 2018/0101626 A1 | 4/2018 | Barowski et al. |

OTHER PUBLICATIONS

List of IBM Patents or Applications Treated as Related, Nov. 13, 2018, 2 pages.

Barowski, Harry et al., "Layout of Large Block Synthesis Blocks in Integrated Circuits," U.S. Appl. No. 16/174,845, filed Oct. 30, 2018, 47-pages.

* cited by examiner

LAYOUT OF LARGE BLOCK SYNTHESIS BLOCKS IN INTEGRATED CIRCUITS

BACKGROUND

Modern integrated circuits have billions of discrete elements (e.g., transistors). Since simultaneous generation of layouts of all discrete elements in the entire integrated circuit (IC) is not possible, the process of IC layout is executed in stages according to the design hierarchy. In the initial stages, layouts of elementary building elements (e.g., transistors and basic cells) are generated. Afterwards, the layouts of the elementary building elements are united in bigger building blocks, such as macrocells (or macros), which are afterwards united in units constituting the IC layout. Every next stage requires not only pacing the layouts of IC building blocks developed in the previous stage according to the floor plan, but generating layouts of additional circuitry and interconnects providing communication of signals between the IC building blocks developed in the previous stage.

In a course of development of central processing units (CPU), their layouts were traditionally partitioned in bottom-level blocks containing fewer than 10,000 standard cells, wherein each bottom-level block is designed independently. This approach is no longer effective for designing of modern CPUs containing billions of transistors because of a need for designing and optimization of large amounts of bottom-level blocks. In order to improve the automation of synthesized blocks in high-performance CPU designs, a new design style is being pursed. Functional units are being flattened and all macros inside are merged into a single large, flat, high-performance block. The resulting entities are called large block synthesis (LBS) blocks. Typical LBS blocks have a number of cells in the rage of 20-500 thousand cells. This big number of cells in the LBS blocks makes their design quite challenging especially of high clock frequency IC operating in the range of 4 GHz and more.

SUMMARY

Shortcomings of the prior art are overcome and additional advantages are provided through the provision of a computer-implemented method of generating a layout of an integrated circuit chip area from a description of an integrated circuit (IC), the description including a register-transfer-level (RTL) design, wherein the RTL design is partitioned into large blocks for synthesis of large block synthesis (LBS) blocks, the description of the IC further includes a first floorplan for the IC, wherein LBS blocks to be synthesized are assigned to respective rectilinear shapes in the first floorplan and said rectilinear shapes do not overlap each other. The method includes selecting a pair of the LBS blocks having their cells synthesized and placed according to the RTL design and the first floorplan and routed according to the RTL design, wherein a first border shape comprised in a rectilinear shape assigned to one of the selected LBS blocks and a second border shape comprised in a rectilinear shape assigned to another one of the selected LBS blocks neighbor each other in the first floorplan, wherein a first value of area utilization of the first border shape by therein placed cells of the one of the selected LBS blocks is less than a first target density value and a second value of area utilization of the second border shape by therein placed cells of the other one of the selected LBS blocks is less than a second target density value, and wherein the first and the second border shapes are rectangular shapes; generating a further floorplan in which the rectilinear shapes of the selected LBS blocks overlap each other and their overlap constitutes an overlap shape comprising at least a portion of the first border shape and at least a portion of the second border shape, wherein a cross-over shape comprises the first border shape and the second border shape, wherein in the further floorplan assignment of portions of the rectilinear shapes outside the cross-over shape assigned to the selected LBS blocks in the first floorplan is the same as in the first floorplan and the cross-over shape comprises interleaved rectilinear shapes which are interchangeably assigned in the further floorplan either to the one of the selected LBS blocks or to the other one of the selected LBS blocks, wherein the interleaved rectilinear shapes and the overlap shape are generated such that the first value multiplied by a first ratio of a geometric area of the first border shape and an overall geometric area assigned to the one of the selected LBS blocks in the first border shape in the further floorplan is greater than or equal to the first target density value and the second value multiplied by a second ratio of the geometric area of the second border shape and the overall geometric area assigned to the other one of the selected LBS blocks in the second border shape in the further floor plan is greater than or equal to the second target density value, and wherein the overlap shape and the cross-over shape are rectangular shapes; generating layouts of the selected LBS blocks, the generating comprising executing synthesis and placement of their cells according to the RTL design and the further floorplan and routing internal interconnects of each of the selected LBS blocks according to the RTL design; based on a first case in which the first value is less than the first target density value and the second value is greater than or equal to the second target density value, updating the further floorplan such that the overall geometric area assigned to the one of the selected LBS blocks in the cross-over shape is increased; based on a second case in which the second value is less than the first target density value and the first value is greater than or equal to the second target density value, updating the further floorplan such that the overall geometric area assigned to the other one of the selected LBS blocks in the cross-over shape is increased; and based on updating the further floorplan, repeating the generation of the layouts of the selected LBS blocks.

Computer program products and systems relating to one or more aspects are also described and claimed herein.

Additional features and advantages are realized through the techniques described herein. Other embodiments and aspects are described in detail herein and are considered a part of the claimed aspects.

BRIEF DESCRIPTION OF THE DRAWINGS

In the following, embodiments of the invention are explained in greater detail, by way of example only, making reference to the drawings in which.

DETAILED DESCRIPTION

Figure 1:
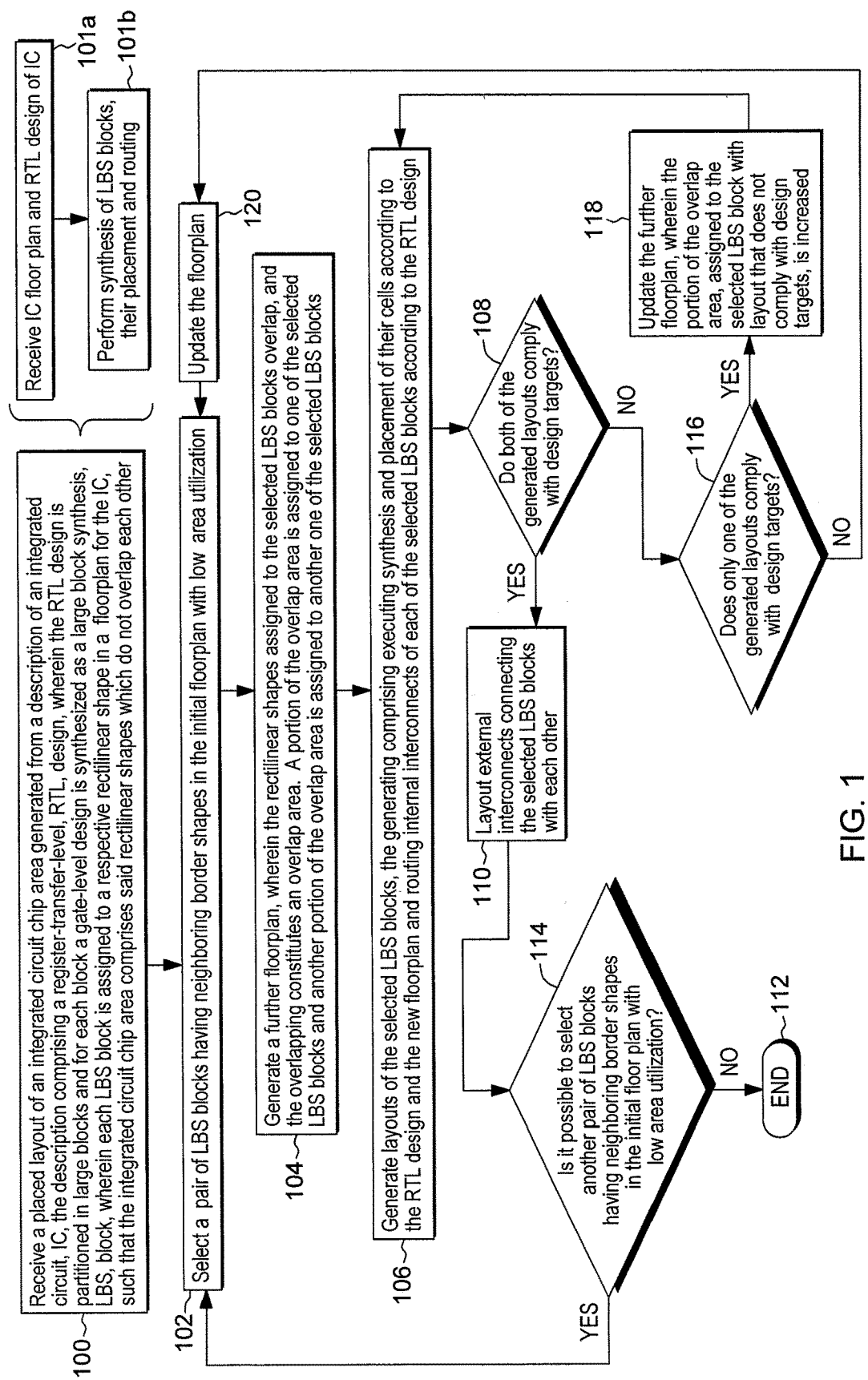
FIG. 1 depicts one example of a flow diagram of a method for generating an IC layout.

Synthesis of LBS blocks is a complex process requiring multi-parameter optimization. After synthesis of the LBS including generation of their layouts, the synthesized LBS blocks are integrated in layouts of units or directly in an IC layout. The process of integration requires further optimization of the synthesized LBS blocks related to synthesis of interconnecting circuitry and interconnects for providing communication between the LBS blocks. When these tasks are performed separately, the area utilization can be compromised, because the layouts of the synthesized LBS blocks have as usual lower area utilization at the peripheries of their layouts in comparison with the central regions of them. Subsequent integration of the synthesized LBS blocks in a next block in the hierarchy of the IC design may not recover poor area utilization of the peripheral regions of the LBS block layouts. Thus, there is a need for an improved procedure for integration of the LBS block layouts enabling improved area utilization of the peripheral regions.

As will be clearly shown further in the text, the problem of low area utilization of the peripheral regions can be improved by overlapping the peripheral regions of the rectilinear shapes assigned for synthesis of the adjacent LBS blocks. The overlap shape constituted by the overlapping of the peripheral regions comprises a set of rectilinear shapes assigned for synthesis of one of the LBS blocks and a set of other rectilinear shapes assigned for synthesis of another one of the LBS blocks. This way of assignment of different rectilinear shapes for synthesis of different LBS blocks can improve area utilization in the common overlap rectangular shape. The effect of improvement of the area utilization can be further increased by selecting specific shapes of the rectilinear shapes in the common overlap shape. In addition, as it will be shown further in the description, the LBS blocks can be synthesized in different processes which can be executed in parallel to each other.

In another embodiment, in the first case, the updating of the further floorplan is executed, when the layout of the one of the selected LBS blocks complies with the specification comprised in the description of the IC. In the second case, the updating of the further floorplan is executed when the layout of the other one of the selected LBS blocks complies with the specification comprised in the description of the IC.

This embodiment may be advantageous because it includes additional criteria related to performance and layout of the laid out LBS blocks. It may take into account aspects of electrical performance of the LBS blocks, or aspects of the wiring routing such as the possibility of routing of wiring according to the specification in general (e.g. without unallowable overlaps).

In another embodiment, the method further comprises: when the first value is greater than or equal to the first target density value and the second value is greater than or equal to the second target density value and the layout of the one of the selected LBS blocks does not comply with the specification comprised in the description of the IC, updating the further floorplan such that an overall geometric area assigned to the one of the selected LBS blocks in the cross-over shape is increased and after the updating of the further floorplan such that the overall geometric area assigned to the one of the selected LBS blocks in the cross-over shape is increased, repeating of the generation of the layouts of the selected LBS blocks; and when the first value is greater than or equal to the first target density value and the second value is greater than or equal to the second target density value and the layout of the other one of the selected LBS blocks does not comply with the specification comprised in the description of the IC, updating the further floorplan such that an overall geometric area assigned to the other one of the selected LBS blocks in the cross-over shape is increased and after the updating of the further floorplan such that the overall geometric area assigned to the other one of the selected LBS blocks in the cross-over shape is increased, repeating of the generation of the layouts of the selected LBS blocks.

This embodiment may be advantageous because it addresses a case when the target utilization parameters are reached and only one of the laid out LBS blocks does not comply with the aforementioned specification.

In another embodiment, the method comprises the following when both of the selected LBS blocks have the layouts which do not comply with the specification comprised in the description of the IC or the first value is less than the first target density value and the second value is less than the second target density value: updating the floor plan; and repeating execution of the generation of the further floorplan and the generating of the layouts of the selected LBS blocks.

This embodiment may be advantageous because it addresses a case when both of the laid out LBS blocks do not comply with the design targets, which can be a failure to comply with specified electrical performance of the synthesized blocks, or to reach target area utilization, etc.

In another embodiment, the updating of the floor plan comprises increasing an overall geometric area of the rectilinear shapes assigned to the selected LBS blocks.

This embodiment can be advantageous because it provides a measure, which can be implemented as a step of an automated computer-implemented method.

In another embodiment, according to the RTL design, at least 20% of connection terminals of the one of the selected LBS blocks are directly connected by external interconnects to at least 20% of connection terminals of the other one of the selected LBS blocks.

This embodiment can be advantageous because it provides additional selection criterion for selecting the pair of LBS blocks for which the area contraction can be performed. Since it is based on evaluation of the information provided as input data for the method, verification of this criterion can be easily implemented as a measure of computer automation.

In another embodiment, each rectilinear shape comprises a rectilinear looped border shape of the each rectilinear shape, an outer perimeter of each rectilinear looped border shape coincides with an outer perimeter of the respective rectilinear shape, the rectilinear looped border shape consists of rectangular border shapes having the same width, wherein a geometrical area of any of the rectilinear looped border shapes is greater than 3% and less than 5% of a geometrical area of the respective rectilinear shape, any of the rectilinear shapes consists of the respective rectilinear looped border shape and a respective rectilinear central shape, wherein the first border shape is a fragment of the respective rectilinear looped border shape having the same width as the respective rectilinear looped border shape, wherein the second border shape is a fragment of the respective rectilinear looped border shape having the same width as the respective rectilinear looped border shape, wherein the first target value is greater than 75% of a third value and less than 85% of the third value, wherein the third value is a value of area utilization of the respective rectilinear central shape by the therein placed cells of the one of the selected LBS blocks, wherein the second target density value is greater than than 75% of a fourth value and less than 85% of the fourth value, wherein the fourth value is a value of area utilization of the respective rectilinear central shape by the therein placed cells of the other one of the selected LBS blocks.

This embodiment may be advantageous because it provides a definition of a border area of the rectilinear shape assigned to the LBS block and criteria for calculation of values which can be implemented as a fully automated computer executable subroutine, which can function without a need of manual designer aid.

In another embodiment, the cross-over shape comprises an edge comprised in only one of the rectilinear shapes assigned to one of the selected LBS blocks, wherein the interleaved rectilinear shapes are interleaved in a direction parallel to the edge.

This embodiment can be advantageous for compact placing of cells of at least one of the selected LBS blocks because according to this embodiment one of the interleaved rectilinear shapes assigned to one of the selected LBS blocks can connect in the further floorplan portions of the rectilinear shapes outside the cross-over shape.

In another embodiment, widths of the interleaved rectilinear shapes are widths of their cross-sections parallel to the edge, wherein the interleaved rectilinear shapes assigned to the one of the selected LBS blocks have the same width.

This embodiment can provide advantages for compact placing of cells in the cross-over shape when the area utilization of the rectangular border shape by the cells of the LBS block placed therein is substantially constant in a direction perpendicular to the edge of the rectangular border shape.

In another embodiment, widths of the interleaved rectilinear shapes are lengths of their cross-sections parallel to the edge, wherein the widths of the interleaved rectilinear shapes assigned to the one of the selected LBS blocks increase in a direction perpendicular to the edge.

This embodiment can be advantageous for compacting interconnects connecting cells having connection terminals for interconnects providing communication between the LBS blocks. These cells can be placed next to each other in the adjacent interleaved rectilinear shapes assigned to different LBS blocks, as a result thereof the lengths of interconnects providing communication between the LBS blocks can be reduced.

In another embodiment, the cross-over shape comprises an edge comprised in only one of the rectilinear shapes assigned to one of the selected LBS blocks, wherein the interleaved rectilinear shapes are interleaved in a direction perpendicular to the edge.

In another embodiment, widths of the interleaved rectilinear shapes are lengths of their cross-sections perpendicular to the edge, wherein the interleaved rectilinear shapes assigned to the one of the selected LBS blocks have the same width.

This embodiment can provide advantages for compact placing of cells in the cross-over shape when the area utilization of the rectangular border shape by the cells of the LBS block placed therein is substantially constant in a direction perpendicular to the edge of the rectangular border shape.

In another embodiment, widths of the interleaved rectilinear shapes are lengths of their cross-sections perpendicular to the edge, wherein the widths of the interleaved rectilinear shapes assigned to the one of the selected LBS blocks increase in a direction parallel to the edge.

This embodiment can be advantageous for compact placing of cells in the cross-over shape when the area utilization of the rectangular border shape by the cells of the LBS block placed therein decreases in a direction perpendicular to the edge of the rectangular border shape.

In another embodiment, the method comprises the following when the layouts of the selected LBS blocks comply with the specification comprised in the description of the IC and the first value is greater than or equal to the first target density value and the second value is greater than or equal to the second target density value: routing of external interconnects connecting connection terminals of the one of the selected LBS blocks to connection terminals of the other one of the selected LBS blocks and placing auxiliary cells in one or more rectilinear shapes assigned for the placing of the auxiliary cells, wherein the one or more rectilinear shapes are comprised in the cross-over shape, wherein some of the external interconnects connect the connection terminals of the one of the selected LBS blocks to the connection terminals of the other one of the selected LBS blocks via the auxiliary cells.

This embodiment can be advantageous because it can enable reservation of an area for placing the auxiliary cells in the cross-over shape. The auxiliary cells can be for instance latches, buffers, or stages used for communication between the LBS blocks. Placing them in the rectangular border shape of the LBS blocks can improve signal propagation in the interconnects connecting the LBS blocks.

In another embodiment, an area of at least one of metallization layers in the IC defined by a projection of the cross-over shape on a plane of the at least one of the metallization layers is split in first rectilinear shapes in which only the internal interconnects of the one of the selected LBS blocks are routed, second rectilinear shapes in which only the internal interconnects of the other one of the selected LBS blocks are routed, and one or more third rectilinear shapes in which only the external interconnects are routed, wherein an overall geometrical area of the first rectilinear shapes differs from an overall geometrical area of the interleaved rectilinear shapes assigned to the one of the selected LBS blocks less than 10%, wherein an overall geometrical area of the second rectilinear shape differs from an overall geometrical area of the interleaved rectilinear shapes assigned to the other one of the selected LBS blocks less than 10%, wherein an overall geometrical area of the one or more third rectilinear shapes differs from an overall geometrical area of the one or more rectilinear shapes assigned for the placing of the auxiliary cells less than 10%.

The assignment of the area in the metallization layer above the cross-over shape in a proportion close to the assignment of the area in the cross-over shape can be advantageous especially for an optimal layout of the internal interconnects connecting only cells of one of the LBS blocks.

In another embodiment, the first and the second rectilinear shapes are interleaved in a substantially similar way as the interleaved rectilinear shapes.

Allocation of areas in the wiring layer in the same way as allocation of areas in the cross-over shape can be advantageous for compacting of internal interconnects connecting only cells of the LBS blocks.

In another embodiment, in the generating of the layouts of the selected LBS blocks the synthesis and the placement of their cells according to the RTL design and the further floorplan is performed in a separate process for each of the selected LBS blocks, wherein in the generating of the layouts of the selected LBS blocks the routing of the internal interconnects of each of the selected LBS blocks according to the RTL design is performed as a separate process for each of the selected LBS blocks.

This embodiment may be advantageous because it can provide parallel generation of the layouts of the selected LBS blocks.

FIG. 1 depicts one example of a flow diagram of a computer-implemented method for generating a layout of an integrated circuit chip area from a description of an IC. The description comprises a RTL design. The RTL design is partitioned in large blocks for synthesis of LBS blocks. The description of the IC further comprises a floorplan for the IC. Each LBS block to be synthesized is assigned to a respective rectilinear shape in the floorplan and the rectilinear shapes do not overlap each other.

Already synthesized, placed, and routed LBS blocks can be used as an input for the method according to a first process block 100 of the method.

Alternatively process blocks 101a and 101b can be executed instead of process block 100. In process block 101a, a description of the IC and the floor plan are received. In process block 101b, executed after process block 101a, the LBS blocks are synthesized and placed according to the RTL design and the new floorplan, and routed according to the RTL design.

Figure 2:
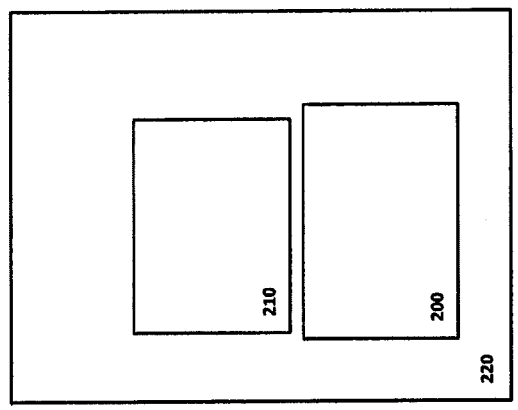
FIG. 2 depicts an example floor plan of an IC.

FIG. 2 illustrates an example floorplan 220 having two rectilinear shapes 200 and 210 each assigned to the respective LBS block. The rectilinear shapes 200 and 210 are depicted as rectangular merely for illustrative purposes. One of the examples of a rectilinear shape which can be used in an IC floorplan is a so-called L-Shape consisting of two adjacent rectangular shapes of different sizes. Other rectilinear shapes in the floorplan 220 are omitted for illustrative purposes.

Process block 102 (FIG. 1) is executed either after process block 100 or after process block 101b. In process block 102, a pair of the LBS blocks having their cells synthesized and placed according to the RTL design and the floorplan are selected according to the selection criteria.

Figure 4:
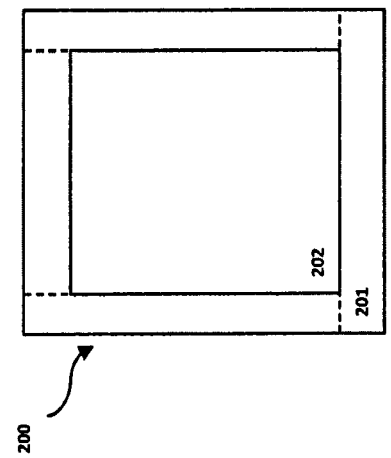
FIG. 4 depicts a schematic illustration of a rectilinear looped border shape of an LBS bock layout.
Figure 3:
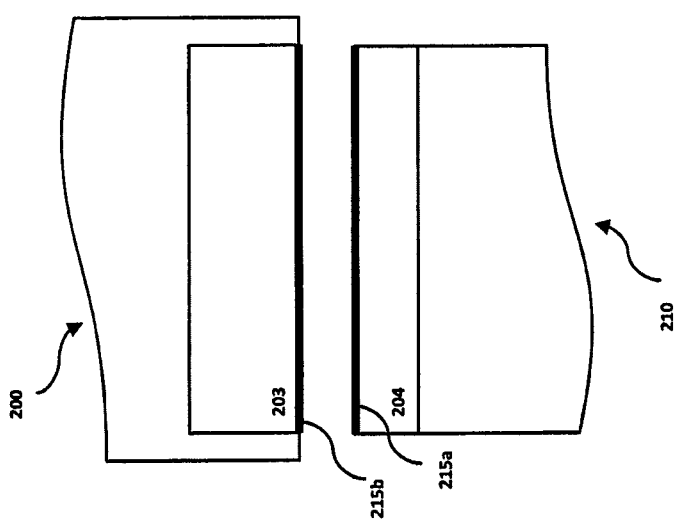
FIG. 3 depicts a schematic illustration of rectangular border shapes of a pair of neighbor LBS blocks.

The selection criteria are illustrated with the help of schematic diagrams depicted in FIGS. 3 and 4. Fragments of the rectilinear shapes 200 and 210 assigned to the selected LBS blocks are depicted in FIG. 3. One of the selection criteria is that the rectilinear shapes neighbor each other in an IC floor plan. The neighboring rectilinear shapes can have edges facing each other as depicted in FIG. 3, wherein no other rectilinear shapes are placed in between the facing edges. The neighboring rectilinear shapes can have their edges at least partially coinciding.

A further selection criterion is that a first value of area utilization of a first rectangular border shape by therein placed cells of the one of the selected LBS blocks is less than a first target density value and a second value of area utilization of a second rectangular border shape by therein placed cells of the other one of the selected LBS blocks is less than a second target density value. The first and the second border shape can face each other in the floorplan, as border shapes 203 and 204 comprised in the respective rectilinear shapes 200 and 210. The first and second border shapes can have a common edge in the floorplan. This would have been the case in FIG. 3 when the edges 215a and 215b of the respective border shapes 210 and 200 coincide in the floorplan. The first value can be calculated as a ratio of an overall area of geometric footprints of the cells placed in the first border area and a geometric area of the first rectangular border area. The second value can be calculated as a ratio of an overall area of geometric footprints of the cells placed in the second border area and a geometric area of the second rectangular border area. The first and the second target density values can be the same. The first and the second target density values can be specified in the description of the IC, i.e. they can be input values of the method. Alternatively, the first and the second target density values can be calculated using respective area utilization values in the central portions of the rectilinear shapes assigned to the selected LBS blocks. The latter approach will be discussed further in the text. The first and the second border shape can have more complex topology; for instance, at least one of the first and second border shapes can be a rectilinear shape.

A further optional selection criterion is that according to the RTL design, at least 20% of the connection terminals of the one of the selected LBS blocks are directly connected by external interconnects to at least 20% of connection terminals of the other one of the selected LBS blocks.

The widths of the first and the second rectangular border shapes are determined according to the following definition which can be readily understood with the help of the illustrative schematic diagram of a rectilinear border shape depicted in FIG. 4. The rectilinear shape (e.g., rectilinear shape 200) comprises a rectilinear looped border shape (e.g., rectilinear looped border shape 201). An outer perimeter of the rectilinear looped border shape coincides with an outer perimeter of a rectilinear border shape, as e.g., depicted in FIG. 4. The rectilinear looped border shape consists of rectangular border shapes of the same width. The rectilinear looped border shape depicted in FIG. 4 consists of 4 rectangular border shapes of the same width. The borders between the 4 rectangular border shapes are marked by the dashed lines in FIG. 4. All of them have the same width and 3 of them have different lengths. The width of the rectilinear border shapes is determined such that a geometrical area of the rectilinear looped border shape is greater than 3% and less than 5% of a geometrical area of the rectilinear shape. The rectilinear shape (e.g., rectilinear shape 200) consists of its rectilinear looped border shape (e.g., rectilinear looped border shape 201) and its rectilinear central shape (e.g., rectilinear central shape 202).

The length of the rectilinear border shapes facing each other can be determined by a length of an edge of a rectilinear shape which is shorter than another edge of another rectilinear shape which faces it. For instance, the edge of the rectilinear shape 210 is shorter than the edge of the rectilinear shape 200 facing it. Thus, the length of edges 215a and 215b of the border shapes 203 and 204 is equal to the length of the edge of the shape 210 which faces the shape 200.

In light of the definition above, the first rectangular border shape is a fragment of the respective rectilinear looped border shape having the same width as the respective rectilinear looped border shape, and the second rectangular border shape is a fragment of the respective rectilinear looped border shape having the same width as the respective rectilinear looped border shape.

In light of the definition above, the rules for calculating the first and the second threshold values can be formulated. The first target density value is greater than 75% of a third value and less than 85% of the third value. The third value is a value of area utilization of the respective rectilinear central shape by the therein placed cells of the one of the selected LBS blocks. The second target density value is greater than 75% of a fourth value and less than 85% of the fourth value. The fourth value is a value of area utilization of the respective rectilinear central shape by the therein placed cells of the other one of the selected LBS blocks.

Turning back to the flow diagram depicted in FIG. 1, process block 104 is executed after process block 102. In process block 104, a further floorplan is generated. In the further floor plan the rectilinear shapes of the selected LBS blocks overlap each other and their overlap constitutes an overlap shape comprising at least a portion of the first border shape and at least a portion of the second border shape. A cross-over rectangular shape comprises the first and the second border shapes, wherein in the further floorplan, assignment of portions of the rectilinear shapes outside the cross-over shape assigned to the selected pair of the LBS blocks in the floorplan is the same as in the floorplan and the cross-over shape comprises interleaved rectilinear shapes which are interchangeably assigned in the further floorplan either to the one of the selected LBS blocks or to the other one of the selected LBS blocks, wherein the interleaved rectilinear shapes and the overlap shape are generated such that the first value multiplied by a first ratio of a geometric area of the first rectangular border shape and an overall geometric area assigned to the one of the LBS blocks in the first rectangular border shape in the further floorplan is greater than or equal to the first target density value and the second value multiplied by a second ratio of a geometric area of the second rectangular border shape and an overall geometric area assigned to the other one of the LBS blocks in the second rectangular border shape in the new floor plan is greater than or equal to the second target density value. The overlap shape is a rectangular shape, when the border shapes are rectangular shapes. The overlap shape is a rectilinear shape, when at least one of the border shapes is a rectilinear shape.

Figure 5B:
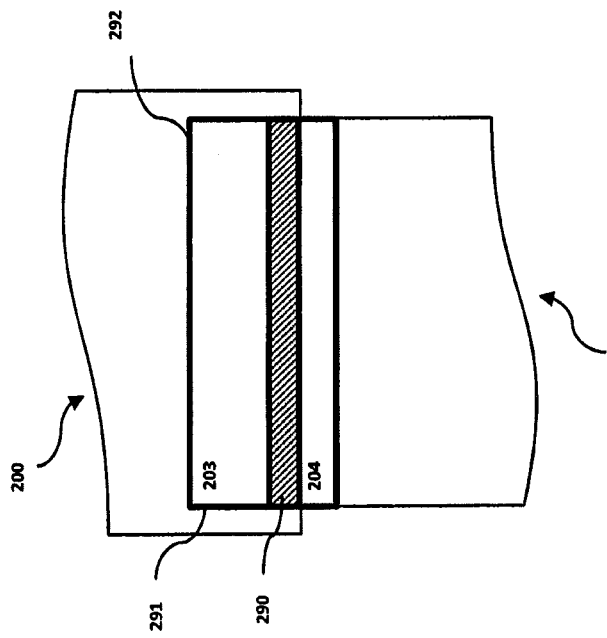
FIGS. 5a, 5b depict schematic illustrations of a rectangular overlap shape constituted by overlap of the rectilinear shapes assigned to adjacent LBS blocks.
Figure 5A:
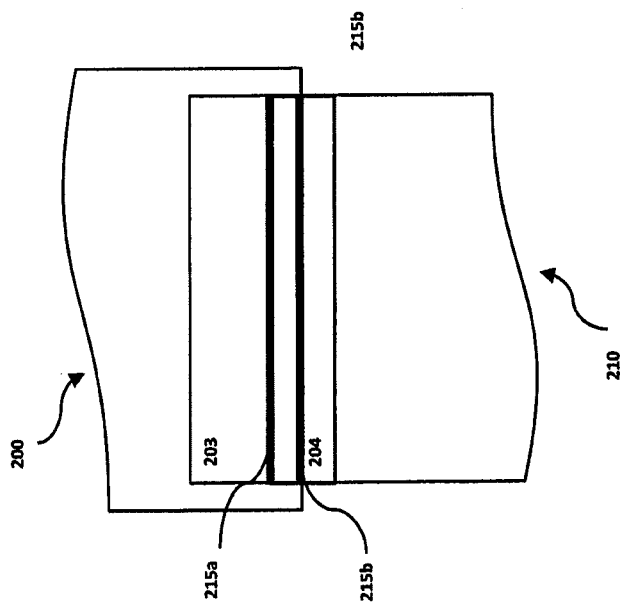

FIGS. 5a and 5b illustrate an example fragment of the further floorplan, wherein the rectilinear shapes 210 and 200 overlap each other and the overlapping constitutes the rectangular overlap shape 290 depicted as a thick hatched rectangular shape in FIG. 5b. The geometrical proportions and sizes are selected merely for illustrative purposes. In this particular example, the rectangular overlap shape 290 comprises a portion of the second rectangular border area 204 and a portion of the first rectangular border area 203. A cross-over shape 291 comprises the second rectangular border area 204 and the first rectangular border area 203. The cross-over shape has one edge (e.g., edge 292) comprised only in one of the rectilinear shapes assigned to one of the selected LBS blocks. This edge is used only for defining of a geometrical direction and is called further in the text as the reference edge.

Figure 7:
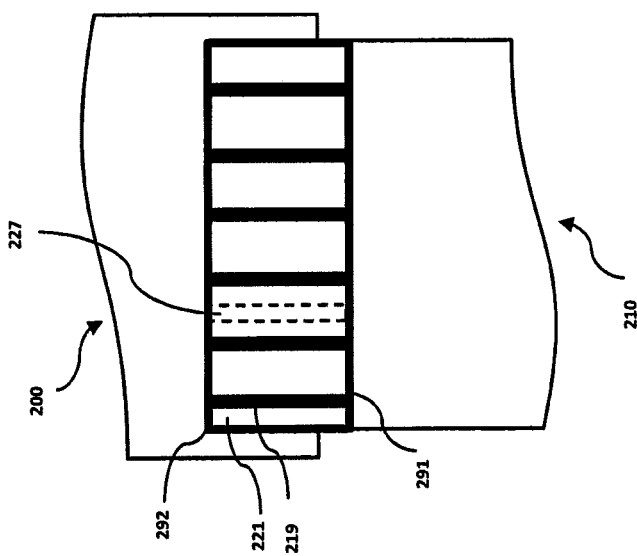
FIGS. 6-9 depict various interleaved rectilinear shapes in a rectangular overlap shape.
Figure 6:
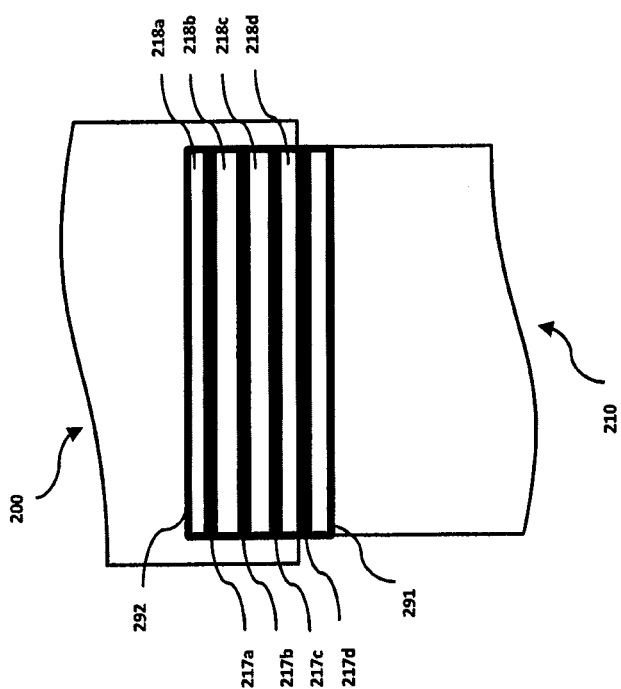
Figure 9:
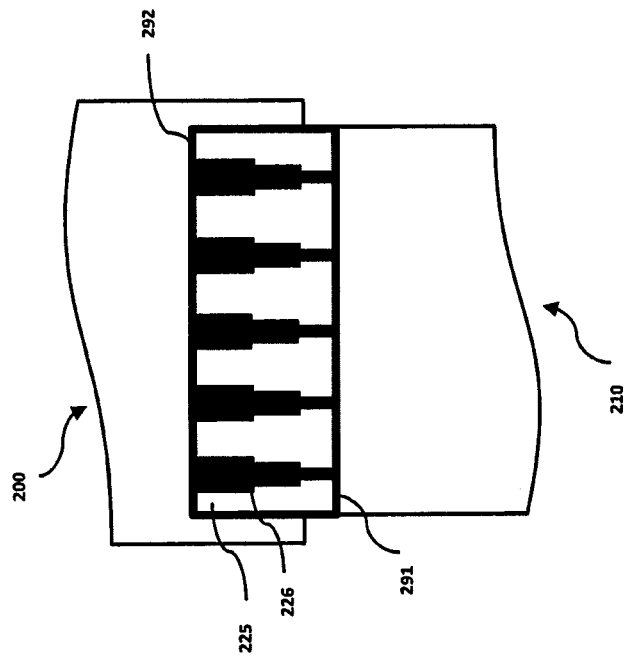
Figure 8:
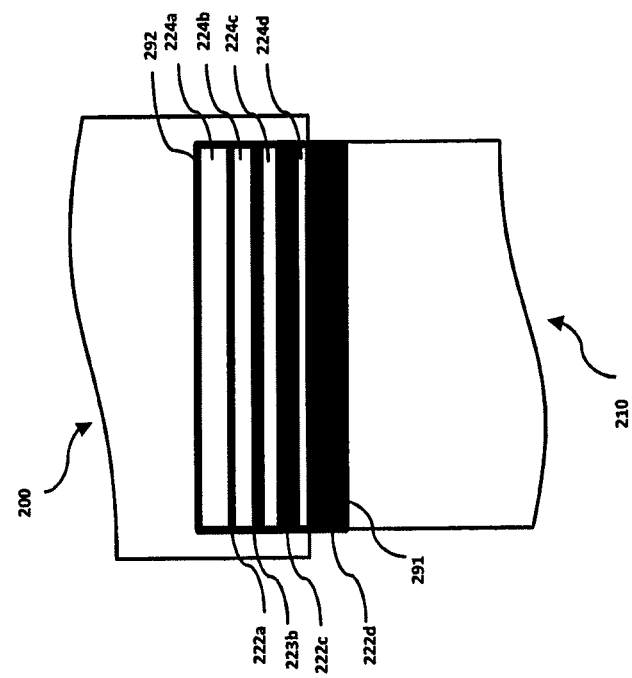

FIGS. 6-9 illustrate various examples of the interleaved rectilinear shapes in the rectangular cross-over shape 291. The interleaved rectilinear shapes 221 and 219, 225 and 226 can be interleaved in a direction parallel to the reference edge 292 (FIGS. 7, 9). Alternatively, the interleaved rectilinear shapes 217a-d and 218a-d, 222a-d and 224a-d can be interleaved in a direction perpendicular to the reference edge 292 (FIGS. 6, 8). The interleaved rectilinear shapes assigned to each of the selected LBS blocks can have the same width as depicted in FIG. 6, wherein the width of the rectilinear shape is determined as a length of its cross-section perpendicular to the reference edge 292. FIG. 7 depicts other interleaved rectilinear shapes, wherein each of the rectilinear shapes assigned either to the one of the LBS blocks or to the other one of the LBS blocks has the same width as well; however, the width of the rectilinear shape in this case is determined as a length of its cross-section parallel to the reference edge 292. Besides this the rectilinear shapes assigned to the one of the LBS blocks or the other one of the LBS blocks may have a varying width from rectilinear shape to rectilinear shape (FIG. 8) and/or a varying width within one rectilinear shape (FIG. 9).

The width of the interleaved rectilinear shapes interleaved along the direction perpendicular to the reference edge is, for instance, a multiple of a height of the circuit row oriented in the same direction. The width of the interleaved rectilinear shapes interleaved along the direction parallel to the reference edge is, for instance, a multiple of a width of a cell having its width in the same direction. The width of the interleaved rectilinear shapes can be of a multiple of a width of a wiring track in a metallization layer in the IC above the cross-over shape. Alternatively, the width of the interleaved rectilinear shapes can be a multiple of the least common multiple of widths of wiring tracks in different metallization layers in the IC above the cross-over shape.

The cross-over shape 291 can further comprise one or more rectilinear shapes 227 assigned for placing auxiliary cells for providing communication between the LBS blocks (FIG. 7).

Turning back to the process block 104, the process block can comprise a special subroutine which selects the most promising pattern of the interleaved rectilinear shapes, which examples are depicted in FIGS. 6-9. The choice can be made on a basis of the distribution of the area utilization in the first and the second rectangular border shapes. For instance, when a local value of the area utilization is close to its average in the first and/or second rectangular border shape then one of the patterns depicted in FIGS. 6 and 7 can be selected; otherwise, one of the patterns depicted in FIGS. 8 and 9 can be selected.

Process block 106 is executed after process block 104. In process block 106, layouts of the selected LBS blocks are generated. The generation of the layouts of the selected LBS blocks comprises executing synthesis and placement of their cells according to the RTL design and the further floorplan and routing internal interconnects of each of the selected LBS blocks according to the RTL design. The generation of each of the layouts can be executed as a separate process. These processes can be executed in parallel.

An area of at least one of the metallization layers in the IC defined by a projection of the cross-over shape on a plane of the at least one of the metallization layers can be split in first rectilinear shapes in which only the internal interconnects of the one of the selected LBS blocks are routed and second rectilinear shapes in which only the internal interconnects of the other one of the selected LBS blocks are routed.

An overall geometrical area of the first rectilinear shapes can differ from an overall geometrical area of the interleaved rectilinear shapes assigned to the one of the selected LBS blocks less than 10%, e.g., less than 5%. An overall geometrical area of the second rectilinear shapes can differ from an overall geometrical area of the interleaved rectilinear shapes assigned to the other one of the selected LBS blocks less than 10%, e.g., less than 5%.

The first and the second rectilinear shapes can be interleaved in the metallization layer in the same way or a substantially similar way as the interleaved rectilinear shapes in the cross-over shape. The periodicity of interleaving of the first and the second rectilinear shapes can be the same or a multiple of the periodicity of the interleaving of the interleaved rectangular shapes.

The first rectilinear shapes can be defined by projections on the plane of the metallization layer of the interleaved rectilinear shapes assigned to the one of the selected LBS blocks. The second rectilinear shapes can be defined by projections on the plane of the metallization plane of the interleaved rectilinear shapes assigned to the one of the selected LBS blocks.

Figure 10:
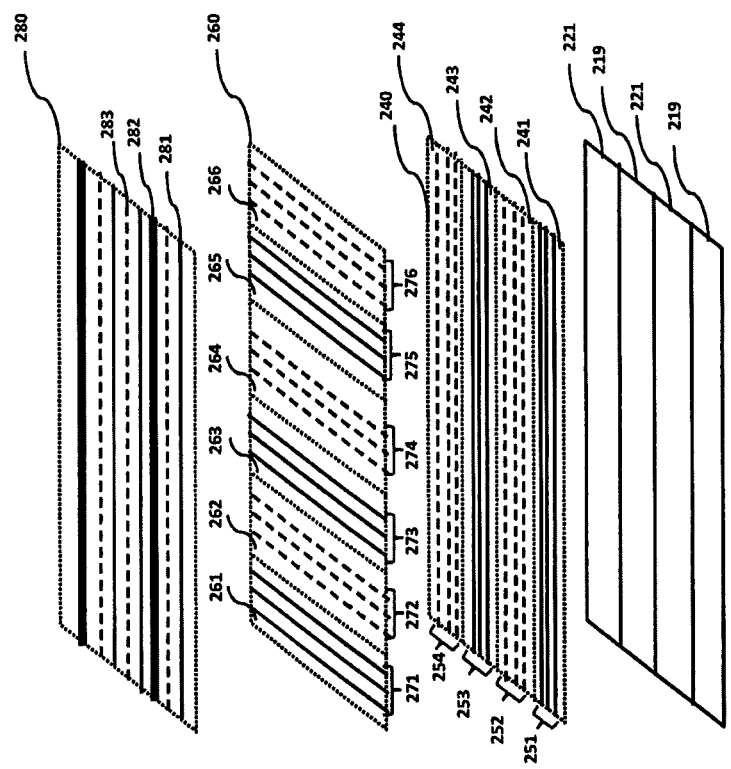
FIG. 10 depicts a schematic illustration of metallization layers above the rectangular overlap shape.

The latter example is depicted on FIG. 10. It depicts a fragment of the routing in metallization layers 240 placed above a fragment of the cross-over shape comprising interleaved rectilinear shapes 219 assigned to one of the selected LBS blocks and interleaved rectilinear shapes 221 assigned to the other one of the selected LBS blocks. The first rectilinear shapes 241 and 243 are defined by the projections on the plane of the metallization layer 240 of the respective interleaved rectilinear shapes 219 in the cross-over shape, while the second rectilinear shapes 242 and 244 are defined by the projections on the plane of the metallization layer 240 of the respective interleaved rectilinear shapes 221 in the cross-over shape. The first rectilinear shapes are assigned only for routing 251 and 253 of the one of the selected LBS blocks and the second rectilinear shapes are assigned only for routing 252 and 254 of the other one of the selected LBS blocks. The first rectilinear shapes 241 and 243 are used only for routing of internal interconnects of the one of the selected LBS blocks. The second rectilinear shapes 242 and 244 are used only for routing of internal interconnects of the other one of the selected LBS blocks. This fragment of the routing can further comprise one or more areas for routing of interconnects connecting cells of different LBS blocks placed in the cross-over shape.

FIG. 10 depicts a fragment of another metallization layer 260 of the IC. A fragment of its area defined by a projection of the cross-over shape on a plane comprising the metallization layer comprises interleaved first rectilinear shapes 261, 263, 265 and second rectilinear shapes 262, 264, 266. However, the first and second interleaved rectilinear shapes are interleaved in a direction being orthogonal to a direction in which the interleaved rectilinear shapes are interleaved in the cross-over shape. The first interleaved rectilinear shapes are used only for routing of the internal interconnects 271, 273, 275 of the one of the selected LBS blocks, while the second interleaved rectilinear shapes are used only for routing of the internal interconnects 272, 274, 276 of the other one of the selected LBS blocks. Periodicity of interleaving of the rectilinear shapes in such metallization layers can be the same or multiple of the periodicity of the interleaving of the rectilinear shapes in the cross-over shape. The first rectilinear shapes 261, 263, 265 are used only for routing of internal interconnects of the one of the selected LBS blocks. The second rectilinear shapes 262, 264, 266 are used only for routing of internal interconnects of the other one of the selected LBS blocks. This fragment of the routing can further comprise as well one or more areas for routing of interconnects connecting cells of different LBS blocks placed in the cross-over shape.

Turning back to the flow diagram depicted on FIG. 1, decision process block 108 is executed after process block 106. When the layouts of the selected LBS blocks comply with the specification comprised in the description of the IC and the first value is greater than or equal to the first target density value and the second value is greater than or equal to the second target density value (i.e., the target area utilization is reached for both of the selected LBS blocks) the decision process block causes execution of process block 110; otherwise, it causes execution of the process block 116.

In process block 110, external interconnects connecting connection terminals of the one of the selected LBS blocks to connection terminals of the other one of the selected LBS blocks are routed and auxiliary cells are synthesized and placed in one or more rectilinear shapes 227 assigned for the placing of the auxiliary cells. Some of the external interconnects can connect the connection terminals of the one of the selected LBS blocks to the connection terminals of the other one of the selected LBS blocks via the auxiliary cells. The auxiliary cells can be, for instance, latches, buffers, stages, etc.

The area of the metallization layer in which the internal and the external interconnects are routed can comprise rectilinear shapes specifically allocated for routing of interconnects of each type: internal interconnects of the one of the selected LBS blocks, internal interconnect of the other one of the selected LBS blocks, and external interconnects. The interconnects of one type can be bundled, i.e. a single rectilinear shape can be used for routing of each of the types of interconnects. Alternatively, several rectilinear shapes can be used for routing of one type of the interconnects, which are interleaved with other rectilinear shapes used for routing of other types of the interconnects. An example of such a metallization layer is depicted on FIG. 10. The metallization layer 280 comprises internal interconnects 281 of the one of the selected LBS blocks, internal interconnects 283 of the other one of the selected LBS blocks, and external interconnects 282. A pattern of the rectilinear shapes in this metallization layer can be determined in a similar way as patterns of interleaved rectilinear shapes 241-244 and 261-266 in the metallization layers 240 and 260.

An area of the metallization layers in the IC defined by a projection of the cross-over shape on a plane of the metallization layers is split in first rectilinear shapes in which only the internal interconnects of the one of the selected LBS blocks are routed, second rectilinear shapes in which only the internal interconnects of the other one of the selected LBS blocks are routed, and one or more third rectilinear shapes in which only the external interconnects are routed. An overall geometrical area of the first rectilinear shapes can differ from an overall geometrical area of the interleaved rectilinear shapes assigned to the one of the selected LBS blocks less than 10%, e.g., less than 5%. An overall geometrical area of the second rectilinear shape can differ from the overall geometrical area of the interleaved rectilinear shapes assigned to the other one of the selected LBS blocks less than 10%, e.g., less than 5%. An overall geometrical area of the one or more third rectilinear shapes differs from an overall geometrical area of the one or more rectilinear shapes assigned for the placing of the auxiliary cells less than 10%, e.g., less than 5%. The first and the second shapes in the metallization layer can be interleaved in a similar way as the interleaved rectilinear shapes in the cross-over shape. Periodicity of the interleaving of the first and the second rectilinear shapes can be the same or a multiple of periodicity of interleaving of the rectilinear shapes in the cross-over shape.

Turning back to the flow diagram depicted on FIG. 1, decision process block 114 is executed after the process block 110. Decision process block 114 causes execution of process block 102 if there is at least one pair of adjacent LBS blocks that have low area utilization in their adjacent border shapes; otherwise, it causes execution of process block 112 in which execution of the method is stopped. The process block can comprise storing the generated layouts of the LBS blocks on a data storage unit of a computer system executing the method.

Execution of the decision process block 116 causes execution of process block 118 when only one of the selected LBS blocks has the layout complying with the specification comprised in the description of the IC and the corresponding first or second value is greater than or equal to the respective third or fourth target values; otherwise, it causes execution of process block 120.

In process block 118, the further floor plan is updated such that the overall geometric area, assigned to the LBS process that has the layout which does not comply with the specification comprised in the description of the IC or has the corresponding first or third value below the respective third or fourth target value, is increased. The increase in the area can be implemented by selecting a different pattern for interleaving of the rectilinear shapes, e.g., patterns for interleaving rectilinear shapes depicted in FIGS. 6-9. Alternatively, or in addition, width of the interleaved rectilinear shapes and/or periodicity of interleaving can be changed. Process block 106 is executed after process block 118.

In process block 120, the floorplan is updated such that a geometrical area of the rectilinear shape assigned to the one of the selected LBS blocks and/or a geometrical area of the rectilinear shape assigned to the other one of the selected LBS blocks is increased. Process block 102 is executed after process block 120.

Those skilled in the art will readily understand, that decision process blocks 108, 116, and 114 can be executed in any arbitrary sequence.

Figure 11:
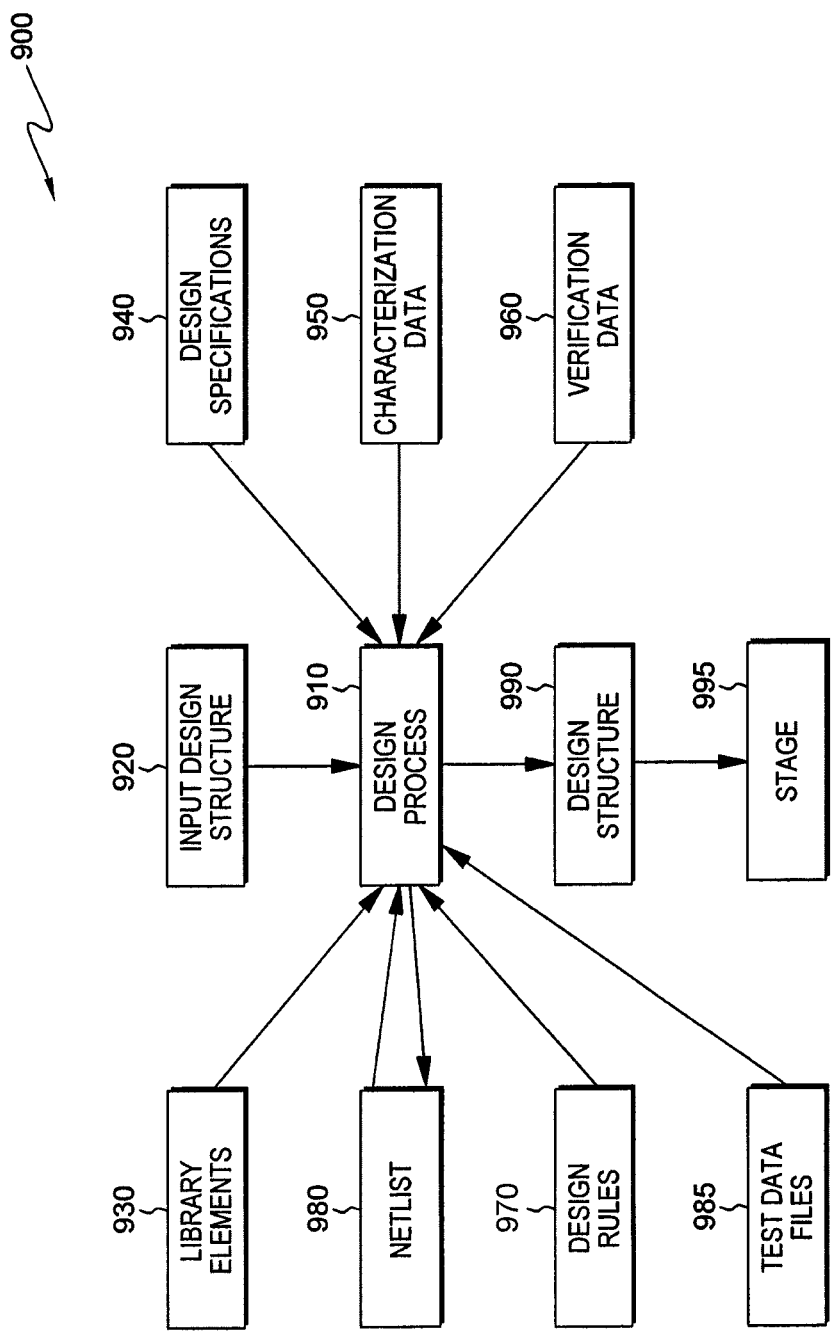
FIG. 11 depicts an example of a flow diagram of a design process used in semiconductor design, manufacture, and/or test.

FIG. 11 is a flow diagram of a design process used in semiconductor design, manufacture, and/or test. The process for generating of a layout of an IC chip area from a description of an IC, which flow diagram is depicted in FIG. 1, can be a part of the design process depicted in FIG. 11. FIG. 11 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 2-10. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g., e-beam writers), computers or equipment for simulating design structures, any apparatus used in the manufacturing or test process, or any machines for programming functionally equivalent representations of the design structures into any medium (e.g., a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 920 that is, e.g., processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as shown in FIGS. 2-10. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 employs and incorporates hardware and/or software modules for synthesizing, translating, or otherwise processing a design/simulation functional equivalent of the components, circuits, devices, or logic structure shown in FIGS. 2-10 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium, such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 20 nm, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes, such as stress analysis, thermal analysis, mechanical event simulation, process simulation for operations, such as casting, molding, and die press forming, etc. One of ordinary skill in the art of mechanical design can appreciate the extent of possible mechanical design tools and applications used in design process 910 without deviating from the scope and spirit of aspects of the invention. Design process 910 may also include modules for performing standard circuit design processes, such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g., information stored in an IGES (Initial Graphics Exchange Specification), DXF (Drawing Interchange Format), Parasolid XT, JT, DRG, or any other suitable format for storing or rendering such mechanical design structures). Similar to design structure 920, design structure 990 comprises one or more files, data structures, or other computer-encoded data or instructions that reside on transmission or data storage media and when processed by an ECAD system generate a logically or otherwise functionally equivalent form of one or more of the embodiments of the invention shown in FIGS. 1-10. In one embodiment, design structure 990 may comprise a compiled, executable HDL simulation model that functionally simulates the devices shown in FIGS. 2-10.

Design structure 990 may also employ a data format used for the exchange of layout data of integrated circuits and/or a symbolic data format (e.g., information stored in a GDSII (GDS2) (GDS-Graphic Database System), GL1, OASIS, map files, or any other suitable format for storing such design data structures). Design structure 990 may comprise information, such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-10. Design structure 990 may then proceed to a stage 995 where, for example, design structure 990: proceeds to tape-out, is released to manufacturing, is released to a mask house, is sent to another design house, is sent back to the customer, etc.

The method as described above is used, for example, in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

As described herein, one aspect provides for a computer-implemented method for generating a layout of an integrated circuit chip area from a description of an IC. The description comprises a register-transfer-level (RTL) design. The RTL design is partitioned in large blocks for synthesis of LBS blocks. The description of the IC further comprises a floorplan for the IC, wherein each LBS block to be synthesized is assigned to a respective rectilinear shape in the floorplan and the rectilinear shapes do not overlap each other.

The method comprises, for instance, selecting a pair of the LBS blocks having their cells synthesized, and placed according to the RTL design and the floorplan and routed according to the RTL design, wherein a first border shape comprised in the rectilinear shape assigned to one of the selected LBS blocks and a second border shape comprised in the rectilinear shape assigned to another one of the selected LBS blocks neighbor each other in the floorplan, wherein a first value of area utilization of the first border shape by therein placed cells of the one of the selected LBS blocks is less than a first target density value and a second value of area utilization of the second border shape by therein placed cells of the other one of the selected LBS blocks is less than a second target density value, wherein the first and the second border shapes are rectangular shapes; generating a further floorplan in which the rectilinear shapes of the selected LBS blocks overlap each other and their overlap constitutes an overlap shape comprising at least a portion of the first border shape and at least a portion of the second border shape, wherein a cross-over shape comprises the first and the second border shape, wherein in the further floorplan assignment of portions of the rectilinear shapes outside the cross-over shape assigned to the selected pair of the LBS blocks in the floorplan is the same as in the floorplan and the cross-over shape comprises interleaved rectilinear shapes which are interchangeably assigned in the further floorplan either to the one of the selected LBS blocks or to the other one of the selected LBS blocks, wherein the interleaved rectilinear shapes and the overlap shape are generated such that the first value multiplied by a first ratio of a geometric area of the first border shape and an overall geometric area assigned to the one of the LBS blocks in the first border shape in the further floorplan is greater than or equal to the first target density value and the second value multiplied by a second ratio of a geometric area of the second border shape and an overall geometric area assigned to the other one of the LBS blocks in the second border shape in the new floorplan is greater than or equal to the second target density value, wherein the overlap shape and the cross-over shape are rectangular shapes; generating layouts of the selected LBS blocks, the generating comprising executing synthesis and placement of their cells according to the RTL design and the further floorplan and routing internal interconnects of each of the selected LBS blocks according to the RTL design; in a first case when the first value is less than the first target value and the second value is greater than or equal to the second target density value updating the further floorplan such that an overall geometric area assigned to the one of the selected LBS blocks in the cross-over shape is increased; in a second case when the second value is less than the first target density value and the first value is greater than or equal to the second target density value updating the further floorplan such that an overall geometric area assigned to the other one of the selected LBS blocks in the cross-over shape is increased; and after the updating of the further floorplan in either the first or in the second case, repeating of the generation of the layouts of the selected LBS blocks.

Another embodiment provides for a computer system comprising a computer processor and a memory storing processor executable code. The execution of the processor executable code by the processor causes the computer system to perform the aforementioned computer-implemented method for generating the layout of the integrated circuit chip area from the description of the IC.

Another embodiment provides for a computer readable medium having stored thereon computer executable code for execution by a computer processor controlling a computer system comprising a memory. The execution of the instructions of the executable code causes the computer processor to execute the aforementioned computer-implemented method for generating the layout of the integrated circuit chip area from the description of the IC.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded there on, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of aspects of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   generating, by the one or more processors, a layout of an integrated circuit chip area from a description of an integrated circuit (IC), the description comprising a register-transfer-level (RTL) design, wherein the RTL design is partitioned into large blocks for synthesis of large block synthesis (LBS) blocks, the description of the IC further comprising a first floorplan for the IC, wherein LBS blocks to be synthesized are assigned to respective rectilinear shapes in the first floorplan and said rectilinear shapes do not overlap each other, the generating comprising:
   selecting a pair of the LBS blocks having their cells synthesized and placed according to the RTL design and the first floorplan and routed according to the RTL design;
   generating a further floorplan in which the rectilinear shapes of the selected LBS blocks overlap each other;
   generating layouts of the selected LBS blocks, the generating comprising executing synthesis and placement of their cells according to the RTL design and the further floorplan and routing internal interconnects of each of the selected LBS blocks according to the RTL design;
   based on a first case in which the first value is less than the first target density value and the second value is greater than or equal to the second target density value, updating the further floorplan such that the overall geometric area assigned to the one of the selected LBS blocks in the cross-over shape is increased; and
   based on a second case in which the second value is less than the first target density value and the first value is greater than or equal to the second target density value, updating the further floorplan such that the overall geometric area assigned to the other one of the selected LBS blocks in the cross-over shape is increased; and
   fabricating an IC chip utilizing the layout.

2. The computer-implemented method of claim 1, wherein the overlap of the selected LBS blocks constitutes an overlap shape comprising at least a portion of the first border shape and at least a portion of the second border shape.

3. The computer-implemented method of claim 2, wherein a cross-over shape comprises the first border shape and the second border shape.

4. The computer-implemented method of claim 3, wherein in the further floorplan assignment of portions of the rectilinear shapes outside the cross-over shape assigned to the selected LBS blocks in the first floorplan is the same as in the first floorplan and the cross-over shape comprises interleaved rectilinear shapes which are interchangeably assigned in the further floorplan either to the one of the selected LBS blocks or to the other one of the selected LBS blocks.

5. The computer-implemented method of claim 3, wherein the interleaved rectilinear shapes and the overlap shape are generated such that the first value multiplied by a first ratio of a geometric area of the first border shape and an overall geometric area assigned to the one of the selected LBS blocks in the first border shape in the further floorplan is greater than or equal to the first target density value and the second value multiplied by a second ratio of the geometric area of the second border shape and the overall geometric area assigned to the other one of the selected LBS blocks in the second border shape in the further floor plan is greater than or equal to the second target density value, and wherein the overlap shape and the cross-over shape are rectangular shapes.

6. The computer-implemented method of claim 3, wherein the generating further comprises:
   based on the first value being greater than or equal to the first target density value and the second value being greater than or equal to the second target density value and the layout of the one of the selected LBS blocks not complying with a specification comprised in the description of the IC, updating the further floorplan such that the overall geometric area assigned to the one of the selected LBS blocks in the cross-over shape is increased.

7. The computer-implemented method of claim 6, wherein the generating further comprises:
   based on the updating of the further floorplan such that the overall geometric area assigned to the one of the selected LBS blocks in the cross-over shape is increased, repeating the generation of the layouts of the selected LBS blocks.

8. The computer-implemented method of claim 3, wherein the generating further comprises:
   based on the first value being greater than or equal to the first target density value and the second value being greater than or equal to the second target density value and the layout of the other one of the selected LBS blocks not complying with the specification comprised in the description of the IC, updating the further floorplan such that the overall geometric area assigned to the other one of the selected LBS blocks in the cross-over shape is increased.

9. The method of claim 8, wherein the generating further comprises:
   based on the updating of the further floorplan such that the overall geometric area assigned to the other one of the selected LBS blocks in the cross-over shape is increased, repeating the generation of the layouts of the selected LBS blocks.

10. The method of claim 1, wherein a first border shape comprised in a rectilinear shape assigned to one of the selected LBS blocks and a second border shape comprised in a rectilinear shape assigned to another one of the selected LBS blocks neighbor each other in the first floorplan, wherein a first value of area utilization of the first border shape by therein placed cells of the one of the selected LBS blocks is less than a first target density value and a second value of area utilization of the second border shape by therein placed cells of the other one of the selected LBS blocks is less than a second target density value, and wherein the first and the second border shapes are rectangular shapes.

11. The method of claim 1, wherein the generating further comprises:
   based on updating the further floorplan, repeating the generation of the layouts of the selected LBS blocks.

* * * * *